(No Model.)
F. KROEBER.
Regulating Attachment for Pendulum Balls.
No. 239,391.  Patented March 29, 1881.
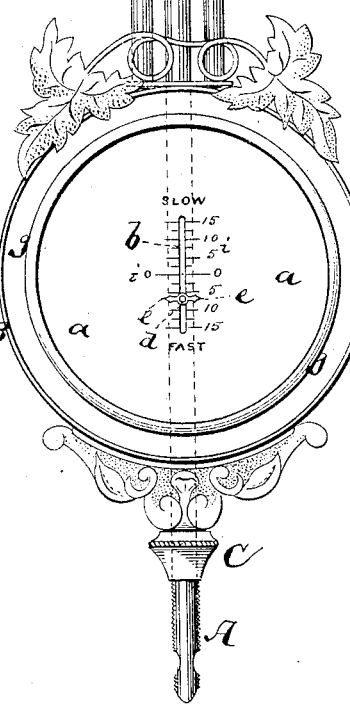

UNITED STATES PATENT OFFICE.

FLORENCE KROEBER, OF NEW YORK, N. Y.

REGULATING ATTACHMENT FOR PENDULUM-BALLS.

SPECIFICATION forming part of Letters Patent No. 239,391, dated March 29, 1881.

Application filed December 6, 1880. (No model.)

*To all whom it may concern:*

Be it known that I, FLORENCE KROEBER, of New York, in the county and State of New York, have invented an Improved Regulating Attachment to Pendulum-Balls, of which the following is a specification.

Figure 1 is a face view, and Fig. 2 a horizontal central section, of a pendulum constructed according to my invention. Figs. 3 and 4 are face views of modifications thereof.

This invention has for its object to indicate to persons using pendulum-clocks the exact degree of adjustment of the ball which may be necessary to regulate the time made by the clock.

It is well known that the pendulum must be shortened to make the clock run faster and lengthened to make it run slower. To this end pendulum-balls are usually supported by the nuts that are placed upon the threaded lower ends of the suspended pendulum-rods, on which rods the balls slide.

My invention consists in combining with said rod and ball a finger or pointer which is in front of or near a graduated scale on the pendulum-ball or on the rod, so that whenever the nut is turned and the ball thereby adjusted, the pointer will indicate on the scale the degree of movement that has taken place. The scale is divided in such manner as to indicate, as near as practicable, the gain or loss in time which will be occasioned by the adjustment of the ball.

I am aware that attempts have heretofore been made to provide pendulums with mechanism which shall indicate the amount of adjustment necessary. But all the devices heretofore proposed, as far as they are known to me, are more or less complicated, and are not applicable to the pendulums now in existence, whereas my improvement is applicable to pendulums now in existence, and also to new pendulums, and is readily understood by a person of ordinary intelligence, and not liable to get out of order at any time.

In the accompanying drawings, the letter A represents the rod by which the pendulum is suspended from the clock-work. B is the vertically-adjustable pendulum-ball, which is arranged to slide on the rod A in suitable manner, and supported by a nut, C, that is screwed upon the lower part of the rod A.

Through the face-plate *a* of the ball B (shown in Figs. 1 and 2) is to be cut a vertical slot, *b*, which is preferably directly in front of the rod A. Through this slot extends a pin, *d*, that is riveted or otherwise fastened to the rod A, and this pin carries a suitable head or pointer, *e*, in front of or near the slot of the face-plate *a*. This face-plate, along the line of the slot *b*, has a scale, *i*, marked upon it, as indicated in Fig. 1, and the word "Slow," or an equivalent mark or term, at the upper part, and the word "Fast," or an equivalent mark or term, at the lower part.

Now, as the ball B is adjusted by turning the nut C, the index hand or pointer *e* will show on the scale how far it ought to be adjusted. Thus, in the position shown in Fig. 1, if the clock is to be made to run faster—supposing it to be about four minutes slow per diem—the nut C is turned to raise the ball B until the index-hand will be about opposite the figure 10 on the lower part of the scale, when four minutes will be gained by the clock.

Of course the scale should be properly graduated on the pendulum-ball with reference to the character of the clock to which the same is to be applied. If the clock is to be made to run slower, the nut C is turned to let the ball drop, which will cause the word "Slow" to approach the pointer *e* as far as may be necessary.

The dial-plate *a* may be placed behind a glass plate, *f*, as indicated in Fig. 2, and both clamped in position by a suitable ring, *g*; but I do not limit myself to any construction of dial-plate or pendulum-ball.

If the plate *a* is made of glass, to leave a pointer or index or notch on rod A behind it in view, or if the rod A and its pointer or index or notch *e* be placed in front of the ball, as in Fig. 3, the slot *b* will not be necessary. Nor will said slot be necessary if the index *e* is placed on the ball and the scale *i* on the rod A, as indicated in Fig. 4.

I am aware that a rotating scale has already been proposed on the nut supporting a pendulum-ball. This I do not claim. The rotating scale is objectionable, as its distinguishing terminals are apt to be carried out of sight, thereby rendering the scale useless.

I claim—

1. The combination of the pendulum-rod A with the vertically-movable pendulum-ball B, one of said parts carrying a straight scale, and the other a pointer or index, and with the nut C, all arranged so that by sliding the ball B up or down, the scale and pointer on the rod A and ball will assist in indicating the extent of the adjustment, substantially as specified.

2. The pendulum-ball B, made with the upright slot $b$, and with the graduated scale along said slot, in combination with the index-hand $e$, rod A, and adjustable supporting device C, substantially as described.

FLORENCE KROEBER.

Witnesses:
A. V. BRIESEN,
WILLIAM H. C. SMITH.